United States Patent
Hung

(10) Patent No.: US 7,529,922 B2
(45) Date of Patent: May 5, 2009

(54) METHOD FOR RECORDING USE TIME OF COMPUTER SYSTEM

(75) Inventor: Hsin-Hui Hung, Taipei County (TW)

(73) Assignee: Giga-Byte Technology Co., Ltd., Taipei Hsien (TW)

(*) Notice: Subject to any disclaimer, the term of this patent is extended or adjusted under 35 U.S.C. 154(b) by 282 days.

(21) Appl. No.: 11/309,734

(22) Filed: Sep. 19, 2006

(65) Prior Publication Data

US 2008/0071608 A1    Mar. 20, 2008

(51) Int. Cl.
G06F 9/24 (2006.01)
G06F 15/177 (2006.01)
G07C 1/10 (2006.01)

(52) U.S. Cl. .................... 713/1; 713/2; 705/32

(58) Field of Classification Search .............. 713/1, 713/2
See application file for complete search history.

(56) References Cited

U.S. PATENT DOCUMENTS 6,781,923 B1 * 8/2004 Lizzi ...................... 368/107
7,181,421 B2 * 2/2007 Peterson et al. ............ 705/32
7,187,626 B2 * 3/2007 Lizzi ...................... 368/107
2003/0088780 A1 * 5/2003 Kuo et al. ................ 713/185
2008/0155538 A1 * 6/2008 Pappas ................... 718/100

FOREIGN PATENT DOCUMENTS

| DE | 19803574 | | 8/1999 |
| DE | 10325724 | | 7/2004 |
| JP | 08249509 A | * | 9/1996 |
| JP | 2005250824 A | * | 9/2005 |

* cited by examiner

Primary Examiner—Suresh K Suryawanshi
(74) Attorney, Agent, or Firm—Jianq Chyun IP Office

(57) ABSTRACT

A method for recording the use time of a computer system is disclosed. The method includes storing the last power-on time of the computer system before shipping (the base use time) and a time variable in the basic input/output system (BIOS). Moreover, the time variable is increased every time a periodic interrupt takes place. The total use time of the computer system is then calculated according to the time variable and the periods of the periodic interrupt. Thus, the base use time and the total use time can be shown on the BIOS setup menu. Therefore, the method is able to achieve the purpose of recording the time and date when the computer system is turned on for the last time just before shipping and the total operating time of the computer system after shipping.

8 Claims, 3 Drawing Sheets

METHOD FOR RECORDING USE TIME OF COMPUTER SYSTEM

BACKGROUND OF THE INVENTION

1. Field of the Invention

The present invention relates to a method for recording the use time of a computer system, and more particularly, to a method for recording the total use time of a computer system after shipping.

2. Description of Related Art

A computer system mainly comprises a main board, a central processing unit (CPU) and a storage device. When we turn on a computer system, the central processing unit inside the computer will automatically execute a series of commands. According to their functions, these commands can be crudely classified into three major categories, namely, system assembly analysis, startup self-diagnostic tests and loading of an operating system. In a routine startup, information such as the model of the central processing unit, the size of the memory and the type of storage device are analyzed to serve as an important reference for taking other actions. Thereafter, the central processing unit retrieves program codes from the basic input/output system (BIOS) chip on the main board to perform a self-diagnostic test and initializes various hardware devices so that the system can operate normally. Finally, an operating system is downloaded and then the control of the computer system is transferred to the operating system at the end of the start-up operation.

After a computer has been shipped out from a manufacturer for some time, the computer system may not start up due to some hardware or software problems. In general, a system supplier will provide a warranty period after the sale of a computer system to guarantee the quality of their products. However, within this period, some users may complain that they could not start the system and use this reason to ask the system supplier for a return of the entire system. When this happens, the system supplier has no way of knowing if the system is really damaged before it is actually used. This can lead to dispute with the consumers, which can damage the image of the system supplier and increase the selling cost of the system supplier.

SUMMARY OF THE INVENTION

Accordingly, at least one objective of the present invention is to provide a method for recording the use time of a computer system. By setting the initial value of a time variable when the computer system is last powered on before shipping, the total use time of the computer system can be calculated so that the total operating time of the computer system after shipping can be displayed. Thus, whether the system has been turned on after the shipment can be easily verified so as to prevent any unwanted dispute between the system supplier and the user.

To achieve these and other advantages and in accordance with the purpose of the invention, as embodied and broadly described herein, the invention provides a method for recording the use time of a computer system. The foregoing method of recording the use time in one embodiment involves a system supplier using a management program to record the current time in the last powering-on of the computer system before shipping as the base use time and then set the initial value of a time variable. Afterwards, the time variable is increased every time a periodic interrupt takes place. Finally, the base use time and the total use time according to the time variable can be shown on the BIOS setup menu.

According to the method of recording the use time of a computer system in one preferred embodiment of the present invention, the current time is the time provided by the real-time clock of the computer system.

According to the method of recording the use time of a computer system in one preferred embodiment of the present invention, the periodic interrupt is the periodic system management interrupt (periodic SMI) provided by the south bridge chip of the computer system.

According to the method of recording the use time of a computer system in one preferred embodiment of the present invention, the method further includes the step of setting the south bridge chip so that the periodic interrupt occurs according to the predetermined period.

In another embodiment of the foregoing method of recording the use time of a computer system, the step further includes providing a management program for recording the base use time and setting the initial value of the time variable. Moreover, the management program can also be used to display the base use time and the total use time.

In the present invention, the system supplier uses a management program to record the last power-on time (that is, the base use time) before shipping the computer system and set the initial value of the time variable. When the system receives the recurring submission of periodic interrupt under normal operating condition, the time variable is increased so that the total use time is calculated through the time variable. Thus, the base use time and the total use time are able to display on the BIOS setup menu or through the management program so that the question of whether the user has used the computer system after shipment can be determined.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
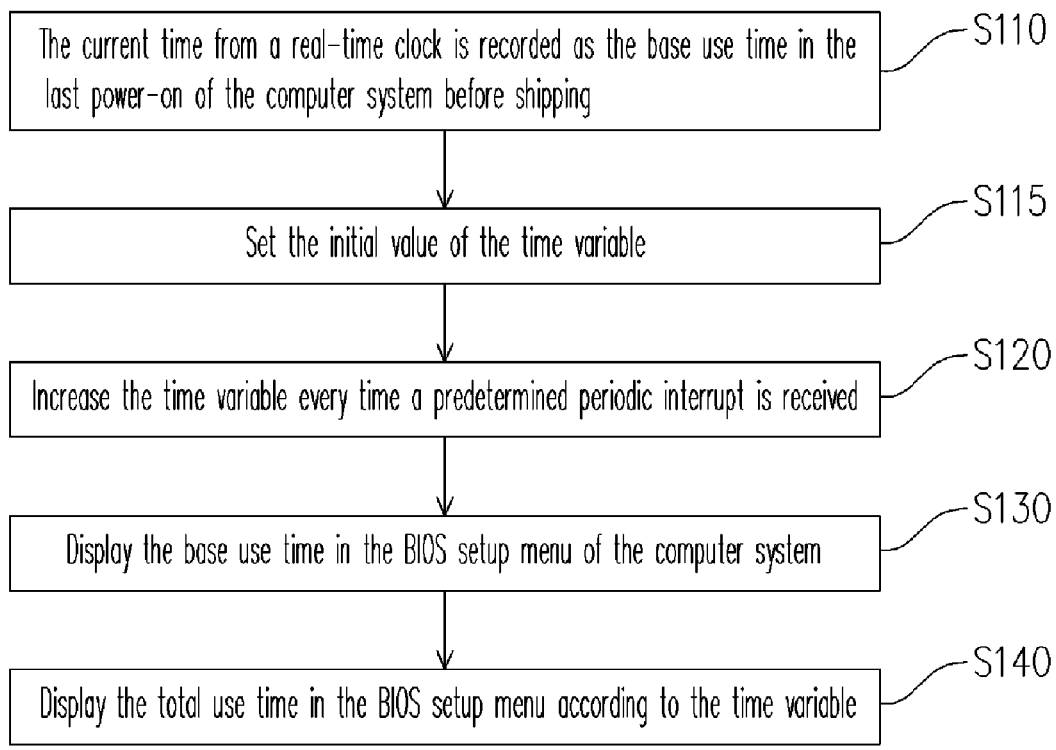
FIG. 1 is a flow diagram showing the steps for recording the use time of a computer system according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

To provide a better understanding of the content in the present invention, the following embodiment is used as an example to illustrate its feasibility.

FIG. 1 is a flow diagram showing the steps for recording the use time of a computer system according to one preferred embodiment of the present invention. As shown in FIG. 1, the steps for implementing the method of recording the use time of a computer system in the present embodiment are described in the following.

First, the system supplier uses a management program to record the last power-on time of a computer before shipping. The recording time captured from the current time of a real-time clock is used as the base use time (in step S110). Furthermore, during the last power-on of the computer system before shipping, the initial value of the time variable must also be set (step S115). In the present embodiment, the initial value is zero. Every time the computer system is turned on, program codes are retrieved from the basic input/output system (BIOS) on the main board to perform a self-diagnostic test and initialize various hardware devices. The BIOS in the present embodiment uses a flash memory to store the aforementioned base use time and other data.

Afterwards, when the computer system receives previously designated periodic interrupt, the time variable is increased (in step S120), for example, the time variable is incremented by one every time an interrupt occurs. In the present embodiment, the time variable is also stored inside the flash memory of the BIOS. Furthermore, the periodic system management interrupt (periodic SMI) provided by the south bridge chip of the computer system is used as the periodic interrupt. In the present embodiment, the time period is one minute. However, other periods can be chosen if necessary. After powering-on the computer system, the south bridge chip will periodically submit a periodic interrupt. The computer system can calculate the total use time according to the number of periodic interrupts received and the length of each periodic interrupt.

Figure 2:
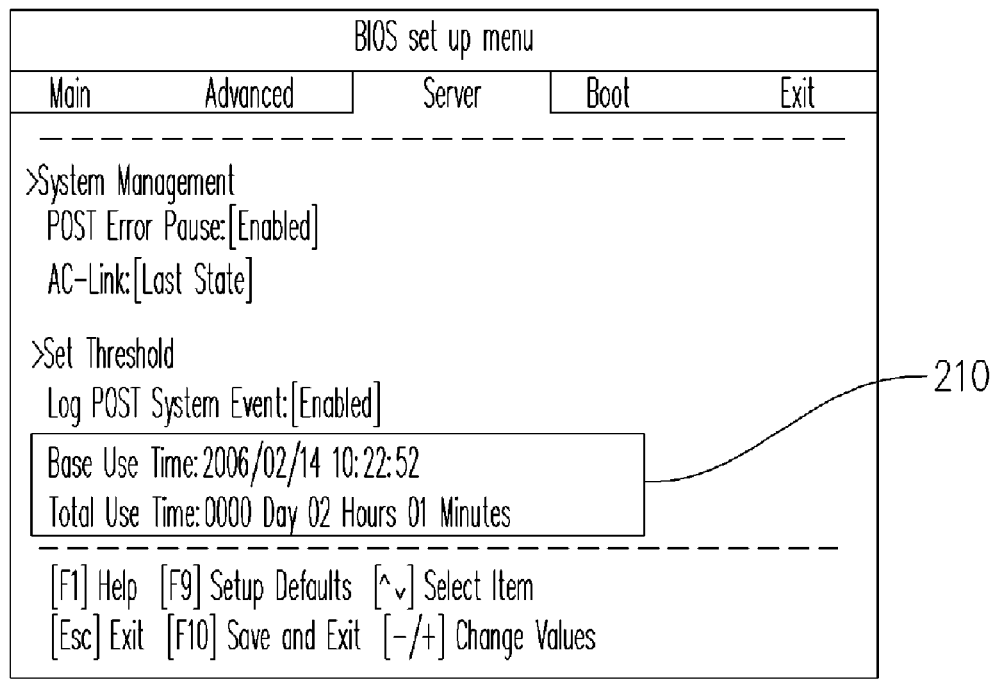
FIG. 2 is a diagram showing the BIOS setup menu interface according to one preferred embodiment of the present invention.

Then, the base use time is displayed in the BIOS setup menu of the computer system (in step S130). When the user advances to the BIOS setup menu (as shown in FIG. 2), the BIOS will read out the recorded base use time and display the record in a block 210 below the menu in a format such as "year/month/day hour: minute: second".

Finally, the total use time according to the time variable is displayed on the BIOS setup menu (in step S140). After the user advances to the BIOS setup menu, the BIOS will simultaneously read out the recorded time variable. The time variable is then converted into a total use time and displayed in a block 210 below the menu (as shown in FIG. 2). In the present embodiment, the computer system multiplies the time variable with the period of the periodic interrupt to deduce the total use time and displays the total use time in a format such as 'day/hour/minute'.

Figure 3A:
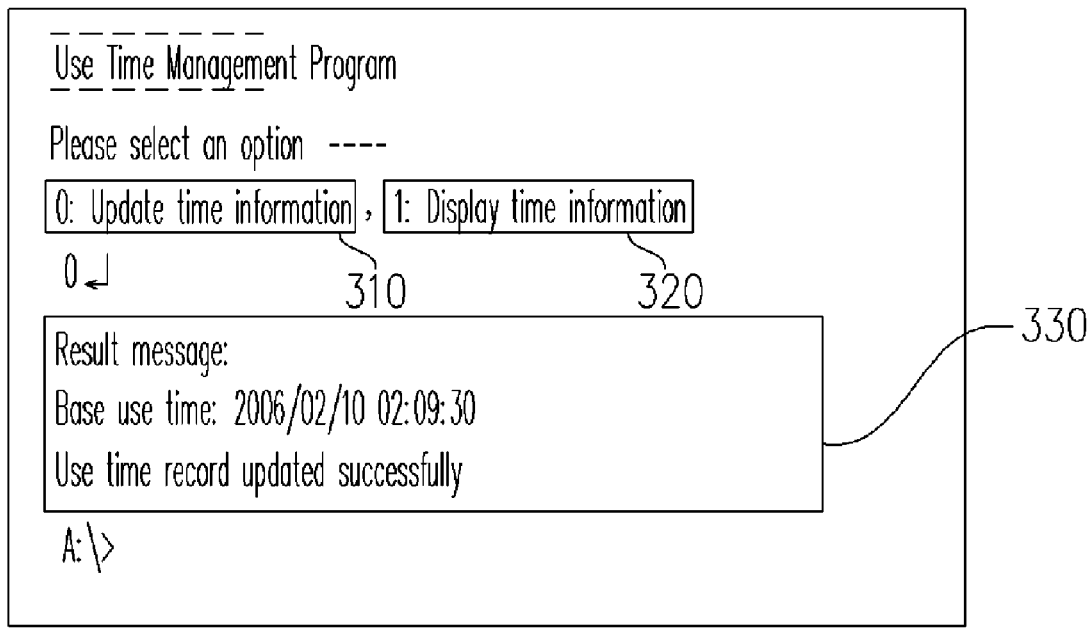
FIGS. 3A and 3B are diagrams showing management program interfaces according to one preferred embodiment of the present invention.

It should be noted that the present invention also provides a management program for recording the base use time and setting the initial value of the time variable. Before shipping the computer system, a powered-on test may be performed to ensure the quality of the computer system. The system supplier can use the management program to record the last power-on time and initialize the time variable before shipping so that the subsequently displayed use time is correct. FIG. 3A is a diagram showing a management program interface according to one preferred embodiment of the present invention. As shown in FIG. 3A, the interface includes a updating option 310 and a displaying option 320. The updating option 310 is used for update the base use time and initializing the time variable. To select this option, a '0' is keyed in so that the base use time is updated to the current time and the time variable is set to a predetermined initial value. The change in the current time is displayed in a result message box 330.

Figure 3B:
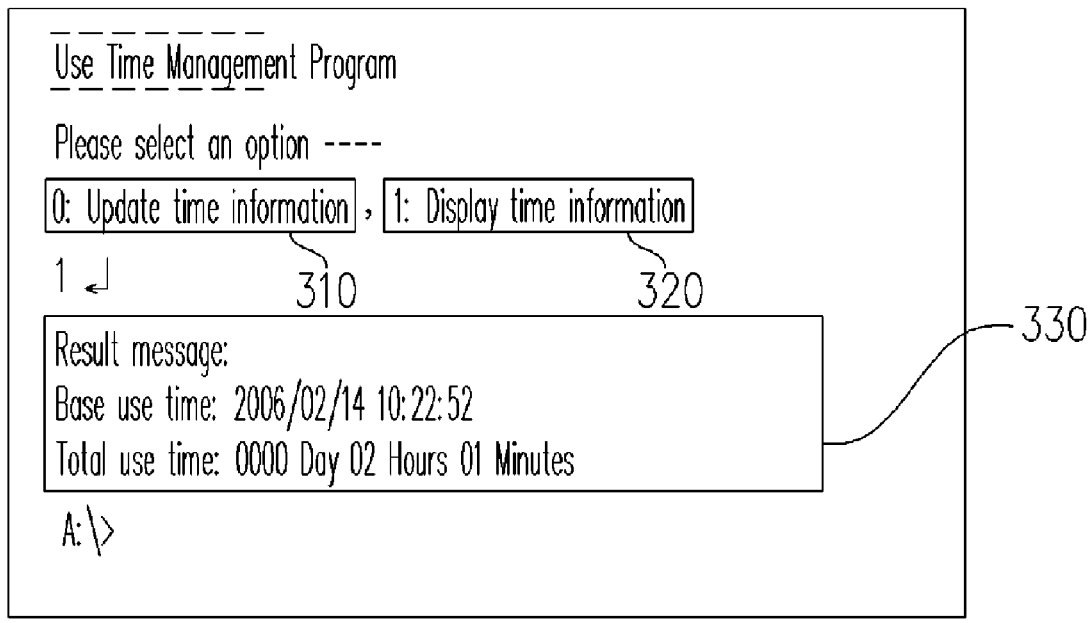

Furthermore, the management program in the present embodiment can also be used to acquire information such as the base use time and the total use time. For example, the display option 320 in the management program interface shown in FIG. 3B is used for displaying the base use time and the total use time. To select this option, a '1' is keyed in so that the base use time and the total use time are displayed in a result message box 330. The information displayed in the result message box 330 and the information displayed in the BIOS setup menu are identical.

When the user requests the system supplier for a refund claiming that the computer system is faulty and cannot be powered on, the system supplier can determine whether the user is really unable to turn on the system according to the total use time. In reality, even if the base use time has not been recorded, the total use time still can be used to determine if a computer system has been used after shipping as shown in the following embodiment.

Figure 4:
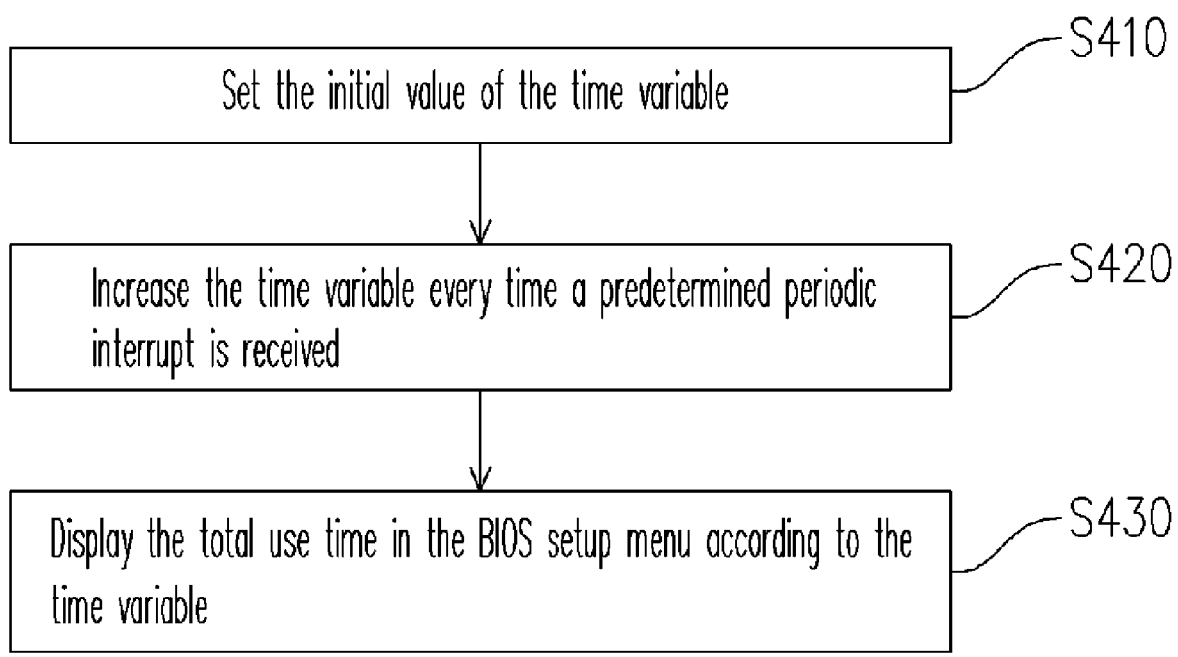
FIG. 4 is a flow diagram showing the steps for recording the use time of a computer system according to another preferred embodiment of the present invention.

FIG. 4 is a flow diagram showing the steps for recording the use time of a computer system according to another preferred embodiment of the present invention. As shown in FIG. 4, a time variable is set with an initial value (in step S410). Then, when designated periodic interrupt is received, the time variable is increased (in step S420). Afterwards, the total use time according to the time variable is displayed in the BIOS setup menu (in step S430). Since the steps in the present embodiment are identical to the steps S115, S120 and S140 in the previous embodiment, a detailed description is omitted.

In summary, the present invention includes at least the following advantages:

1. The system supplier can inquire the use time record of the computer system and determine if a user has used the computer system after shipment.

2. The system supplier can look up the total use time through the BIOS setup menu of the computer system or the management program to determine whether after-sale services are to be provided.

3. Since the system supplier is the owner of the management program, the system supplier can use the management program to renew the base use time and the total use time records. Because the management program is not supplied to general users, the users cannot change the foregoing records. Hence, disputes between the user and the system supplier can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of recording use time of a computer system, comprising:

setting an initial value of a time variable in the last power-on of the computer system before shipping;

recording a current time as a base use time in the last power-on of the computer system before shipping;

increasing the time variable every time a periodic interrupt occurs; and displaying a total use time and the base use time in a basic input/output system (BIOS) setup menu of the computer system according to the time variable.

2. The recording method of claim 1, wherein the periodic interrupt is the periodic system management interrupt provided by the south bridge chip of the computer system.

3. The recording method of claim 2, further comprising:

setting the south bridge chip so that the periodic interrupt occurs at a predetermined period.

4. The recording method of claim 1 further comprises:

providing a management program for setting the initial value of the time variable.

5. The recording method of claim 4, wherein the management program is used to display the total use time.

6. The recording method of claim 1, wherein the current time is provided by a real-time clock of the computer system.

7. The recording method of claim 1, further comprises:

providing a management program for recording the base use time and setting the initial value of the time variable.

8. The recording method of claim 7, wherein the management program is used for displaying the base use time and the total use time.

* * * * *